May 22, 1973     H. AUSTERMANN     3,734,699

REINFORCED PIG IRON WEAR PLATE

Original Filed Dec. 19, 1967

INVENTOR.
HERBERT AUSTERMANN

BY

*McGlew & Toren*
ATTORNEYS

United States Patent Office 3,734,699
Patented May 22, 1973

3,734,699
REINFORCED PIG IRON WEAR PLATE
Herbert Austermann, Dortmund-Solde, Germany, assignor to Hermann Rappold & Co., GmbH, Duren-Birkesdorf, Germany
Continuation of application Ser. No. 691,793, Dec. 19, 1967. This application Aug. 28, 1970, Ser. No. 68,003
Claims priority, application Germany, Dec. 19, 1966, H 61,335
Int. Cl. B23p 3/20
U.S. Cl. 29—191.4
7 Claims

ABSTRACT OF THE DISCLOSURE

A cast iron wear plate, particularly resistant to stresses due to grinding action and due to impacts, such as are characteristic of mining operations, has the following composition in percentages by weight: carbon 3.4 to 4.1%, silicon 0.15 to 0.6%, manganese 0.5 to 0.9%, phosphor 1.6 to 2.0% and sulphur 0.025 to 0.15%, balance substantially all iron with the usual impurities. The wear plate has cast therewith a gridwork of circular cross section reinforcing rods arranged in two superposed layers so as to form square or rectangular interspaces, these circular cross section steel rods being welded to each other. A fastening screw or screws are also cast with the wear plate.

This application is a continuation of application Ser. No. 619,793, filed Dec. 19, 1967 and now abandoned.

BACKGROUND OF THE INVENTION

Wear plates of the type to which the present invention is directed are used in mining operations in the conveying of ore and coke, and several plates are joined to each other to form liners, for example, which are built into bunker or bin arrangements, into miner's cars, into conveying troughs and into pouring funnels. These plates have to withstand stresses by the material to be mined, and this material acts on the plates with a grinding and impacting action.

For this reason, wear plates of the type to which the present invention is directed have been made from casting and steel alloys, which have been developed for this special purpose. However, experience has demonstrated that, if such plates are used and are made from such special alloys and other materials developed for this special purpose, the resistance to impact and wear is not sufficient to meet the stringent requirements which prevail in feeding ore and coke. It has furthermore been demonstrated, again by experience, that the wear which, in fact, takes place has been so great that the plates had to be exchanged after a maximum period of use of about two months. It has further been found that, after the same maximum time period, it was necessary to replace plates which had wear surfaces built up by welding with electrodes of material extremely resistant to wear.

Another condition known to those skilled in the art is that, with respect to known wearing plates, the manner of securing the plates to the walls or floors to be protected results in the necessity for many repairs. The prior art securing method involved providing bores in the plates, the walls, or the floor, and passing screws through these bores with the screws being secured, from the exterior, with nuts. When the plates were subjected to stresses, the screw heads had a tendency frictionally to move against the wear plates. Due to the wear which took place in this manner, at the lower or bottom sides of the screw heads, the plates became loose so that the screws had to be constantly tightened or had to be exchanged. This, of course, has resulted in frequent interruption of the operation.

A certain improvement has been accomplished by using ceramic stones characterized by containing aluminum oxide, zirconium oxide and glass fibers. While these ceramic materials prolonged the life of the linings and also resulted in decreased repair time for the wearing linings, the ceramic stones, due to their high costs, constituted a very significant price increase in the overall installation. Furthermore, although the ceramic stones have a relatively high wear resistance, their resistance to impact, particularly in the impact zones through which the plates have to pass, is not satisfactory, since the stones are brittle and have a tendency to break and thus to fall out. Attempts to prevent breaking and subsequent falling out, by adhesively connecting the stones to the walls and floors, did not result in any significant improvement.

SUMMARY OF THE INVENTION

This invention relates to wear plates particularly risk resistant to simultaneous stresses resulting from grinding action and from impacts and, more particularly, to an improved, simplified, and less expensive wear plate having these characteristics and which has a substantially increased life.

In accordance with the invention, a material for wear plates, for use in ore and coke conveying, is provided. This material, on the one hand, meets the requirements with respect to high wear resistance and also meets the requirements, particularly in the impact zone, where there are considerable impact stresses. At the same time, the material in accordance with the invention is significantly less expensive than ceramic stones.

In accordance with the invention, a wear plate is provided using, as a material, a wear resistant pig iron having the following analysis in percentages by weight:

| | Percent |
|---|---|
| Carbon | 3.4 to .41 |
| Silicon | 0.15 to 0.6 |
| Manganese | 0.5 to 0.9 |
| Phosphor | 1.6 to 2.0 |
| Sulphur | 0.025 to 0.15 | the remainder iron containing the usual impurities contained in pig iron. When plates made from this material were used as wear plates, no wear could be ascertained after operations of up to five months duration.

In a further development of the invention, the wear plates are reinforced with round cross section steels in such a manner that these steels or steel rods are cast, together with the plates, as situated in superposed layers so as to form square or rectangular interspaces. These circular cross section steels or rods are welded to each other and are cast with the plates while the plates are being produced by casting. In this manner, it is prevented that any broken portions of a plate can become loose and fall down or fall away. It is also advantageous to cast the fastening or securing screws into the wearing plates during casting of the plates. This prevents the disadvantage of any loosening which occurs by securing the plates when screws are inserted through apertures in the plates.

An object of the invention is to provide an improved composition for wear plates subjected to simultaneous stresses by grinding action and by impacts.

Another object of the invention is to provide an improved wear plate for use in mining operations and the conveying of ore and coke and the like.

A further object of the invention is to provide such a wear plate comprising essentially wear resistant pig iron.

Yet another object of the invention is to provide such a wear plate comprising wear resistant pig iron containing carbon, silicon, manganese, phosphor and sulphur within selected percentage range.

A further object of the invention is to provide such a wear plate having a long useful life without appreciable wear.

Another object of the invention is to provide such wear plates which are reinforced with circular cross section steel rods arranged in superposed layers to intersect each other to form square or rectangular interspaces, the rods being welded to each other and being cast with the plates while the latter are being produced by casting.

A further object of the invention is to provide such a wear plate in which fastening or securing screws are cast into the plates during casting of the plates.

BRIEF DESCRIPTION OF THE DRAWINGS

For an understanding of the principles of the invention, reference is made to the following description of a typical embodiment thereof as illustrated in the accompanying drawings.

In the drawings.

DESCRIPTION OF THE PREFERRED EMBODIMENT

Figure 1:
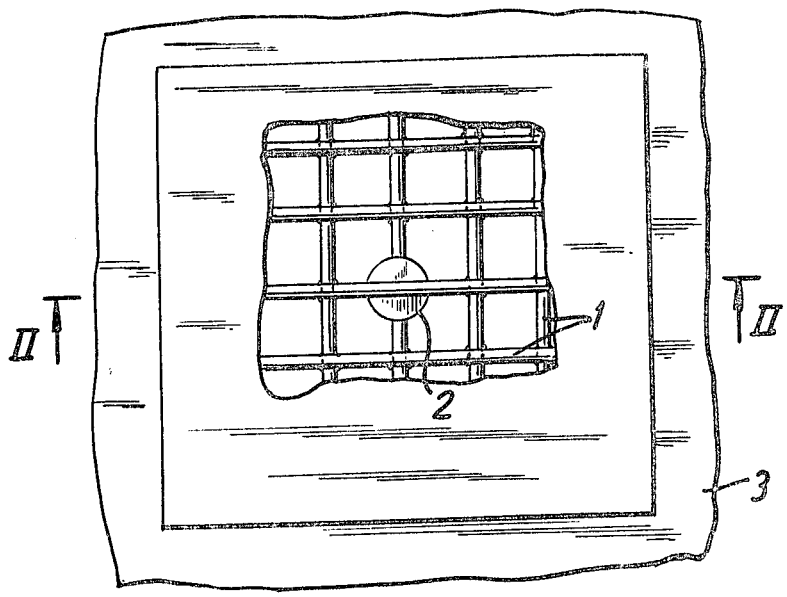
FIG. 1 is a plan or elevation view of a wear plate embodying the invention, partly broken away to illustrate its reinforcement.
Figure 2:
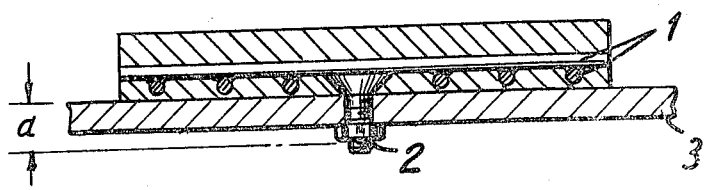
FIG. 2 is a transverse sectional view taken along the line II—II of FIG. 1.

FIG. 1 illustrates, in plan or elevation, a wear plate embodying the invention and made from pig iron. A reinforcement 1 has been inserted or cast into the wear plate during casting thereof and, as shown in FIG. 2, terminates at the periphery of the plate. Reinforcement 1 consists of round or circular cross section steels or rods arranged in at least two rows, one above the other, to form square or rectangular interspaces. These steels or rods are welded to each other and the diameter of the rods or steels, as well as the form and size of the interspaces, are determined by the particular use to which the wear plate is to be put.

A securing or fastening screw 2 is also cast into the wear plate during casting thereof, and serves to secure the wear plate to a mounting surface. The extent of projection of screw 2 from the plate is dependent on the thickness of the floor or wall 3 to which the lining plate is to be secured, plus the thickness of a nut used to secure screw 2 to the floor or wall 3. The necessary minimum length of the screw 2 is indicated at a.

The advantages pertinent to the invention consist particularly in that, by using the new wear plates, the life of the linings, in ore and coke feeding or transport devices and plants, is extended by a multiple factor. Furthermore, with the disclosed method of securing the plates in position by casting in screws, loosening of the plates is effectively prevented. These measures, in addition to the very low production cost of wear plates embodying the invention, results in very substantial overall savings in the cost of an installation.

As stated, the wear plate of the invention has the following composition, expressed in percentages by weight:

| | Percent |
|---|---|
| C | 3.4 to 4.1 |
| Si | 0.15 to 0.6 |
| Mn | 0.5 to 0.9 |
| P | 1.6 to 2.0 |
| S | 0.025 to 0.15 | balance substantially all pig iron with the usual impurities.

While a specific embodiment of the invention has been shown and described in detail to illustrate the application of the principles of the invention, it will be understood that the invention may be embodied otherwise without departing from such principles.

What is claimed is:

1. A cast metal wear plate having a long life and being highly resistant to simultaneous stresses due to impact and grinding action, the cast material of said plate having essentially the following composition:

| | Percent |
|---|---|
| C | 3.4 to 4.1 |
| Si | 0.15 to 0.6 |
| Mn | 0.5 to 0.9 |
| P | 1.6 to 2.0 |
| S | 0.025 to 0.15 | the balance being all pig iron with the usual impurities, said cast metal wear plate including reinforcing means reinforcing the cast material of said plate, said reinforcing means consisting of circular cross-section steel rods.

2. A cast metal wear plate, as claimed in claim 1, in which said rods are arranged in superposed rows to form rectangular interspaces.

3. A cast metal wear plate, as claimed in claim 2, in which said rods are weld united to each other at their intersections.

4. A cast metal wear plate, as claimed in claim 1, in which said rods are arranged in superposed rows to form square interspaces.

5. A cast metal wear plate, as claimed in claim 4, in which said rods are weld united to each other at their intersections.

6. A cast metal wear plate, as claimed in claim 1, in which said rods are cast together with the cast material of said wear plate.

7. A cast metal wear plate, as claimed in claim 6, including at least one securing element cast into the cast material of said plate and projecting from a surface of said plate.

References Cited

UNITED STATES PATENTS

| 587,493 | 8/1897 | Sargent | 188—255 |
| 1,443,186 | 1/1923 | Lester | 105—225 |
| 1,419,395 | 6/1922 | MacKenzie | 29—191.4 X |
| 1,527,165 | 2/1925 | Bennett | 75—123 CB |
| 1,130,680 | 3/1915 | Thompson | 188—255 |

ALLEN B. CURTIS, Primary Examiner

U.S. Cl. X.R.

75—123 CB